3,306,949
ALKALI METAL POLYMERIZATION OF
DIOLEFINS
Joseph Kern Mertzweiller, George Guttner, and Horace Marion Tenney, all of Baton Rouge, La., assignors to Esso Research and Engineering Company, a corporation of Delaware
No Drawing. Filed Oct. 12, 1964, Ser. No. 403,385
5 Claims. (Cl. 260—680)

This invention relates to the polymerization of olefins using hydrocarbon-alkali metal catalysts and more particularly relates to the preparation of colorless polymers of diolefins or copolymers of diolefins with mono-olefins.

The polymerization of conjugated diolefins or their copolymerization with mono-olefins using alkali metals or alkali metal complexes as polymerization initiators in the presence of relatively high concentration of an ether is well known in the art. Such a system has many advantages. The high ether concentration promotes high polymerization activity and results in products which are particularly useful in the preparation of surface coatings due to the high percent of the diolefin units being present in the polymer in a 1,2 structure. Unfortunately, however, the product is colored, varying from shades of yellow to amber. Studies have shown that this is apparently due to the presence of about 0.5 to 1 wt. percent of oxygen, mostly in the form of hydroxyl groups resulting from the incorporation of ether molecules into the polymer, probably as terminal groups. If such a reaction occurs during polymerization, the ether functions as a chain terminator and leads to decreased average molecular weight and broader molecular weight distributions. In accordance with the present invention it has been found that the presence of these chromophore groups can be avoided by maintaining the temperature below 0° F. both during the polymerization and during the catalyst quench operations. By operating in this manner an essentially water-white polymer can be obtained.

The conjugated diolefins which can be polymerized according to the process of this invention are preferably the conjugated diolefins having four to eight carbon atoms, such as butadiene, isoprene, dimethylbutadiene, piperylene, methyl pentadiene and the like. Espectially preferred are the conjugated diolefins containing 4 to 6 carbon atoms. These may be copolymerized with other monomers such as styrene, vinyl toluene, methyl methacrylate, butyl acrylate, acrylonitrile and methacrylonitrile.

The catalyst or polymerization initiator may be any of several types including:

(1) An alkali metal, such as sodium, potassium, lithium, cesium and rubidium, (2) The alkyl compounds of the above metals where alkyl is methyl, ethyl, propyl, isopropyl, butyl, amyl or the like, (3) The aryl derivatives of the above metals where aryl is phenyl, naphthyl, benzyl, etc., (4) A dianionic compound of the above metals which compounds is a "living" polymer of very low molecular weight prepared by controlled addition of a diolefin to one of the above alkali metals in the presence of a high concentration of ether or mixture of ether and hydrocarbon diluent. Specifically this is the addition product of the monomer to be polymerized and the alkali metal. The hydrocarbon may be pentane, hexane, decane, cyclohexane and the like.

The catalysts of group (1) above are used in fine dispersion, particle sizes below 100 microns being particularly effective. Those from groups (2), (3), and (4) are employed in solution in the ether diluent. The amount of catalyst or initiator which can be used will vary depending on the molecular weight desired. Usually the terminally reactive polymers are liquids, having molecular weights in the range of 1000 to about 20,000. However, depending on the monomers employed and the amount of initiator used, semi-solid and solid terminally reactive polymers can be prepared having molecular weights up to 150,000 and higher. Usually the initiator is used in amounts between about 0.1 and 0.001 equivalent of alkali metal per mole of monomer.

The ether diluents suitable for use in the process of the invention include the aliphatic and cycloaliphatic ethers such as tetrahydrofuran, dioxane, diethyl ether, diamyl ether and the like. The amount of ether is also important. Increasing the amount of ether diluent gives increased amount of 1,2 structure found in the polymer and increased polymerization rate. For the purposes of this invention the ether diluent should be used in amounts between 0.5 and 5 moles per mole of monomer.

At the completion of the reaction, the mixture is then treated to deactivate the alkali metal or metal compound and recover the polymer. Thus, the reaction mixture may be treated with carbon dioxide and subsequently with an acid to replace the terminal alkali metal groups with —COOH or the crude reaction mixture may be coagulated by the addition of a large amount of alcohol or acid such as acetic, etc. and then recovering the polymer or by contacting the polymer with clay containing 1 to 25 wt. percent of adsorbed water and filtering. A particularly effective method of quenching the polymerization mixtures is treatment at a temperature of 0° F. or below with the stoichiometric quantity (with respect to alkali metal) of an anhydrous acid of high acid strength, e.g. anhydrous HCl. When the reaction is carried out in a high concentration of ether the alkali metal salt is separated almost instantly as crystals of large particle size which are easily separated by filtration or centrifugation. Polymers of very low alkali metal content (less than 10 p.p.m.) are attainable by this method. This is particularly important for resins which are to be used as surface coatings since relatively small concentrations of alkali metals have been found to inhibit cures of such resins. It has been also found that concentrated aqueous acids, e.g. 37% aqueous HCl can be used with equal effectiveness and this is a very convenient laboratory method.

In accordance with the invention the polymerization and catalyst deactivation steps of the process are carried out at temperatures below 0° F., e.g. —110 to 0° F., whereby substantially water-white products are obtained.

The process of the invention will be better understood by reference to the following examples which are, however, not meant to limit the invention.

*Example 1*

A series of runs were carried out in which butadiene was polymerized in the presence of 450 gms. of tetrahydrofuran using 29 gms. of sodium naphthalene as the initiating catalyst and the catalyst quenched with HCl.

Only the polymerization and catalyst quench temperatures were varied.

| Polymerization Temperature, °F. | Quench Temperature, °F. | Color | Polymer Properties | | |
|---|---|---|---|---|---|
| | | | Weight Percent $O_2$ | Mol Weight | Conv. |
| 0 to −5 | −3 | Nearly water-white | 0.32 | 1,905 | 90 |
| 86 | 86 | Yellow | 0.89 | 1,214 | 84 |
| 0 to −3 | 73−86 | ----do---- | 0.40 | | 95+ |

*Example 2*

To a 500 ml. three neck round bottom flask previously dried by flaming under specially dried nitrogen purge, there was charged 232 gms. of dried and redistilled tetrahydrofuran. To this, with good agitation, a sodium dispersion (50% in heavy oil) was added in 2–3 gram increments alternately with the addition of butadiene which was introduced from the vapor phase. The temperature of the reaction mixture was controlled and kept in the range of 75 to 90° F. The mixutre soon assumed a dark reddish brown coloration. During the course of forty minutes four increments of sodium dispersion were introduced or a total of 11.8 grams (5.1 grams of sodium). The total butadiene added during this same period was 107 grams.

The temperature of the mixture was raised to 122° F. and held at this temperature one and one-half hours. The temperature was then reduced to 32° F. and concentrated HCl was added to bring the mixture to the neutral condition. After removal of the solvent the resulting resin was determined to have a number average molecular weigth of 1053. The oxygen content determined by neutron activation was 1.44. It was clear but of a high yellow color.

*Example 3*

The amount of 197 grams of dry tetrahydrofuran was introduced to a 500 ml. three neck flask previously flamed and dried under nitrogen purge. To this was added benzyl sodium. Titration showed the resulting solution to contain 0.27 milliequivalent per gram of sodium. The temperature was adjusted and controlled at 77° F. while a total of 121 grams of butadiene was added in the vapor phase over a sixteen minute period. The mixture was neutralized with HCl at a temperature of 85 to 95° F. The resulting solution of polymer contained 38% non-volatile matter. The calculated molecular weight would be 2000. The Gardner color of the solution was 1.5.

The above examples showed that only by maintaining both the polymerization temperature and the quench temperature at 0° F. or below can a substantially colorless product be obtained.

The nature of the present invention having been fully set forth and a specific example of the same given, what is claimed as new and useful and desired to be secured by Letters Patent is:

1. In a process for polymerizing diolefins of 4 to 8 carbon atoms in which the diolefin is contacted with a catalyst chosen from the group consisting of alkali-metal and alkali-metal-hydrocarbon complexes, deactivating the catalyst and recovering the polymer, the improvement which comprises carrying out the polymerization and the deactivating steps at temperatures between −110° and 0° F.

2. The process of claim 1 in which the catalyst is an alkali metal.

3. The process of claim 1 in which the catalyst is sodium.

4. The process of claim 1 in which the catalyst is an alkali-metal-hydrocarbon complex.

5. The process of claim 4 in which the catalyst is naphthalene sodium.

References Cited by the Examiner

UNITED STATES PATENTS

| | | | |
|---|---|---|---|
| 2,631,175 | 3/1953 | Crouch | 260—669 |
| 2,732,412 | 1/1956 | Gleason et al. | 260—669 |
| 2,787,647 | 2/1957 | Crouch et al. | 260—666 |

DELBERT E. GANTZ, *Primary Examiner.*

G. E. SCHMITKONS, *Assistant Examiner.*